(12) United States Patent
Berchowitz

(10) Patent No.: US 8,713,934 B2
(45) Date of Patent: May 6, 2014

(54) LUBRICANT FREE, REDUCED MASS, FREE-PISTON, STIRLING MACHINE HAVING RECIPROCATING PISTON DRIVINGLY LINKED TO ROTARY ELECTROMAGNETIC TRANSDUCER MOVING IN ROTATIONAL OSCILLATION

(75) Inventor: David M. Berchowitz, Athens, OH (US)

(73) Assignee: Global Cooling, Inc., Athens, OH (US)

( * ) Notice: Subject to any disclaimer, the term of this patent is extended or adjusted under 35 U.S.C. 154(b) by 442 days.

(21) Appl. No.: 12/914,087

(22) Filed: Oct. 28, 2010

(65) Prior Publication Data

US 2011/0095542 A1   Apr. 28, 2011

Related U.S. Application Data

(60) Provisional application No. 61/255,525, filed on Oct. 28, 2009.

(51) Int. Cl.
*F01B 29/10* (2006.01)
*F02G 1/04* (2006.01)

(52) U.S. Cl.
USPC .............................................. 60/520; 60/517

(58) Field of Classification Search
USPC ..................... 60/516–526; 74/88–89; 92/137
See application file for complete search history.

(56) References Cited

U.S. PATENT DOCUMENTS

| | | | | |
|---|---|---|---|---|
| 3,973,445 A * | 8/1976 | Ballard | ........................ | 74/89.21 |
| 5,753,985 A | 5/1998 | Redlich | | |
| 5,988,994 A * | 11/1999 | Berchowitz | .................... | 417/415 |
| 7,043,909 B1 * | 5/2006 | Steele | .............................. | 60/517 |
| 7,134,279 B2 | 11/2006 | White et al. | | |
| 7,171,811 B1 | 2/2007 | Berchowitz et al. | | |
| 2009/0039655 A1 * | 2/2009 | Berchowitz | .................... | 290/1 A |
| 2009/0217904 A1 * | 9/2009 | Lee et al. | ...................... | 123/25 P |

* cited by examiner

*Primary Examiner* — Thomas Denion
*Assistant Examiner* — Brian Inacay
(74) *Attorney, Agent, or Firm* — Frank H. Foster; Kremblas & Foster

(57) ABSTRACT

A free-piston Stirling machine drivingly coupled to at least one rotary electromagnetic transducer. At least one pulley is oriented in a plane of a reciprocating piston connecting rod. At least one motion translating drive link connects the connecting rod to the pulley by at least two straps so that the pulley moves in rotationally oscillating motion. The two straps extend along an arcuate surface of the pulley into connection to the piston rod at two spaced locations. The pulley is linked to a rotary electromagnetic transducer so that both move in rotationally oscillating motion. Preferably a piston spring resonates the piston at an operating frequency of the Stirling machine and a torsion spring resonates the pulley in rotational oscillation at the operating frequency of the Stirling machine.

18 Claims, 7 Drawing Sheets

FIG. 1 PRIOR ART
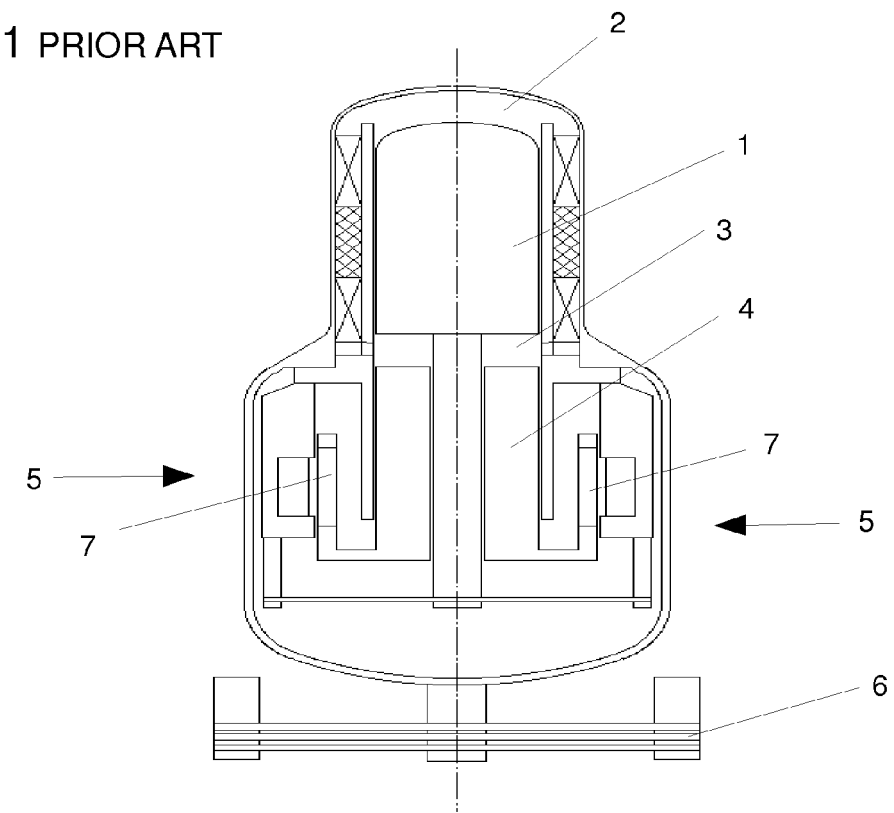
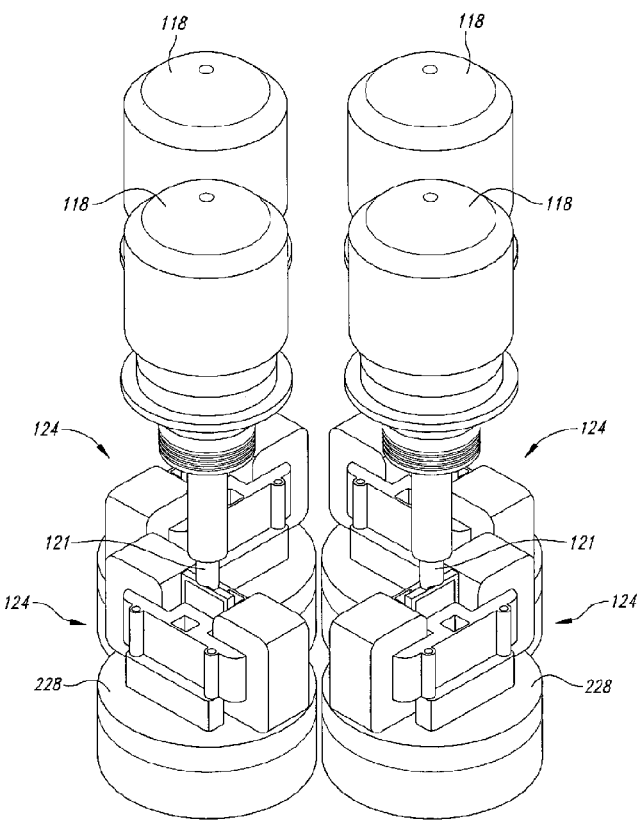
FIG. 2 PRIOR ART

FIG. 8
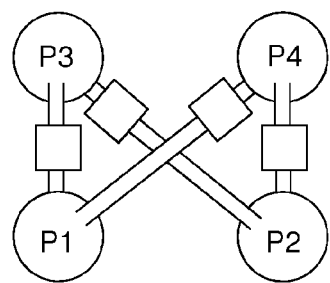
FIG. 9
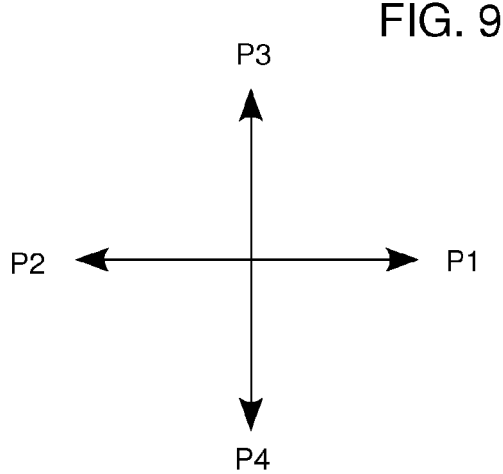
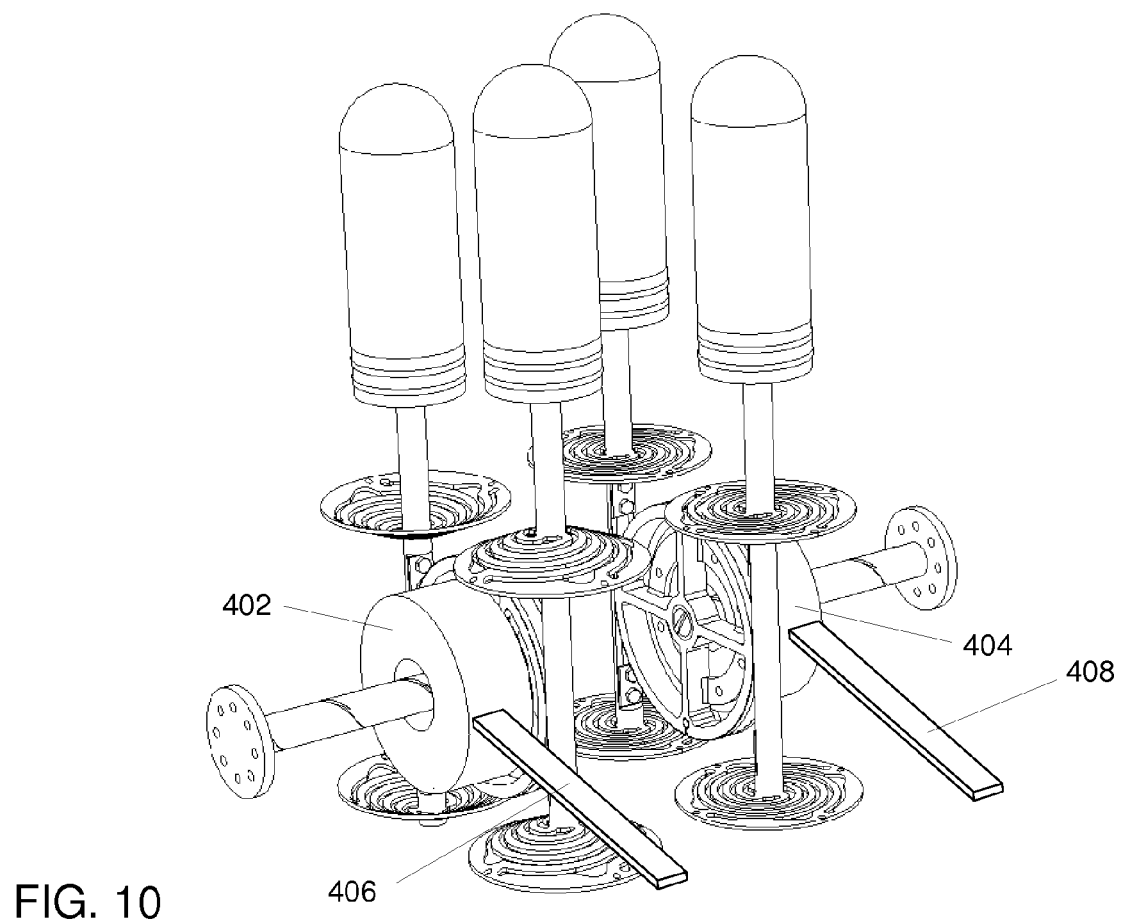
FIG. 10

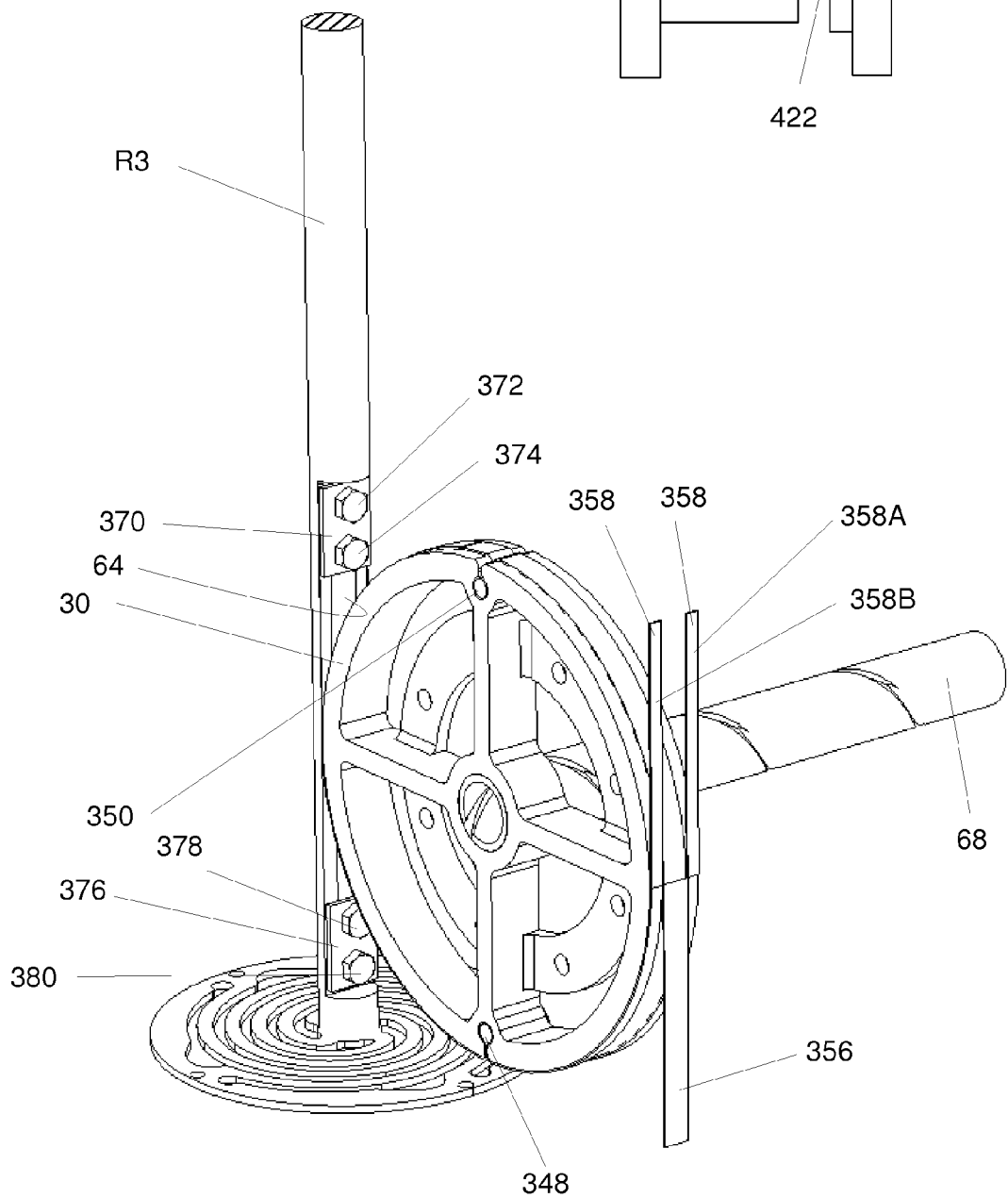

LUBRICANT FREE, REDUCED MASS, FREE-PISTON, STIRLING MACHINE HAVING RECIPROCATING PISTON DRIVINGLY LINKED TO ROTARY ELECTROMAGNETIC TRANSDUCER MOVING IN ROTATIONAL OSCILLATION

CROSS-REFERENCES TO RELATED APPLICATIONS

This application claims the benefit of U.S. Provisional Application No. 61/255,525 filed Oct. 28, 2009.

The above prior provisional application is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

This invention is directed to Stirling machines, both Stirling engines and Stirling coolers or heat pumps, that are drivingly coupled to electromagnetic transducers in the form of rotary electric motors and alternators for generating electrical power or using electrical power to drive a free-piston Stirling machine as a cooler or heat pump. The invention provides a manner of constructing them that reduces their mass and eliminates the friction of the motion converting drive between them and thereby eliminates the need for lubricants that contaminate the working gas of the Stirling machine. The invention improves the life, reliability and cost of the coupled Stirling machine and transducer while also avoiding the possibility of lubricant contamination of the working gas. The invention provides a higher ratio of power to mass thereby decreasing the size, weight, and volume of the coupled devices by using a rotary transducer and removes the need for lubricant by using a drive connection that has no friction and therefore does not require lubricant. The invention has the advantages of rotary alternator/motors without the disadvantage of lubricants that contaminate the working gas. The invention is particularly suited for alpha configuration Stirling machines but can also be applied to beta configured Stirling machines.

Stirling machines and particularly free-piston Stirling machines are very well known in the prior art and therefore the details of their operation are not described in this patent. The present invention uses the technology that is known in the art for the Stirling machine component of the invention except to the extent that structures and modifications are described. Similarly, the present invention uses the technology that is known in the art for rotary electromagnetic transducers except that the rotary electromagnetic transducers used with the invention are driven in a manner that differs from the conventional drive mode.

Free-piston Stirling machines are the only form of Stirling technology that have demonstrated a long reliable operational life. For practical implementations of a Stirling engine connected to an electromagnetic transducer for generating electrical power, some form of linear alternator has been used by all practitioners of the art.

FIG. 1 and FIG. 2 illustrate examples of such prior art implementations of a Stirling machine drivingly coupled to a linear electromagnetic transducer. FIG. 1 illustrates a conventional beta configured free-piston Stirling engine or heat pump drivingly coupled to a linear alternator or motor. This configuration has been the traditional vehicle for free-piston implementations. The displacer 1 shuttles the gas between the expansion space 2 and the compression space 3 while the piston 4 compresses the gas when it is mostly in the compression space and expands it when it is mostly in the expansion space. A linear alternator or motor 5 takes the output or provides the input depending on whether the machine is an engine (prime mover) or a heat pump, respectively. Since the moving magnets 7 of the linear alternator or motor 5 are directly connected to the piston 4, the amplitudes of the piston 4 and the magnets 7 are identical. The peak velocity of the piston 4 and the magnets 7 are therefore also identical. Balance mass 6 is resonated at or close to the operating frequency in order to reduce residual vibrations. The beta configuration suffers a central difficulty in that it scales poorly to higher powers. At higher powers, above about 1 kW, the machine becomes excessively large. The alpha configuration is the preferred embodiment for higher powers but linear alternator/motors do not scale well to the higher powers and therefore lead to large bulky embodiments and/or the need for expensive materials such as cobalt bearing alloys for the magnetic flux paths.

In order to apply the free-piston concept to alpha configured Stirling machines, linear alternator/motors 124 may be added to each piston as in U.S. Pat. No. 7,171,811 by Berchowitz and Kwon or as shown by U.S. Pat. No. 7,134,279 by White et al. as illustrated in FIG. 2. However, linear alternators or motors have a large mass compared to rotating alternators or motors and are therefore difficult to apply to alpha configured Stirling machines particularly at higher power levels of several kilowatts or above. More specifically, "power density" and "specific power" are terms used for an engineering parameter that describes the ratio of average or maximum power to mass. Although it is desirable to have the largest practical power density (power per unit of mass), linear electromagnetic transducers have a lower power density than rotary electromagnetic transducers. Therefore it would be desirable to have a practical manner of coupling an alpha configured Stirling machine to a rotary electromagnetic transducer.

FIG. 2 shows a four-cylinder alpha machine configured with a free-piston drive using linear alternators on each piston according to U.S. Pat. No. 7,134,279. Because linear alternators are bulky, the piston axes are forced apart further than would be ideal from a thermodynamic and packaging viewpoint. FIG. 2 shows the piston assemblies 118 and linear alternator assemblies 124 for a four-cylinder alpha configured free-piston Stirling engine. This sketch is taken from U.S. Pat. No. 7,134,279 and is numbered accordingly. Additional gas springs 228 are provided. Crank driven alpha configured machines suffer from the requirement of oil lubrication, extremely tight seals that separate the working gas from the oil and the resulting wear leading to low operational life and poor reliability. Up to now, there have been no practical mechanisms for alpha machines that have the intrinsic reliability of the beta-type free-piston machine.

Most large power alpha Stirling machines have utilized crank mechanisms driving rotary alternators. However, the alpha machines also have huge problems with friction in their motion converting mechanisms that convert the reciprocating motion of their pistons to rotary motion. The motion converting mechanisms that they use require conventional lubrication by conventional petroleum based or other lubricants. They also consume a lot of power overcoming friction and the friction causes them to wear out too soon. These prior art machines have suffered severe difficulties in separating the Stirling cycle working gas (usually helium or hydrogen) from the oil lubricant needed to lubricate their motion converting mechanisms. The seals that separate the working fluid from the oil suffer from high friction leading to power losses and rapid wear-out. As is well established in the prior art, free-piston machines do not themselves require oil lubrication and therefore do not require oil separating seals. Ideally, if alpha configured machines are to become long lived and reliable, it is necessary to find a mechanism that provides all the advantages of oil-free operation that are currently enjoyed by the beta configured free-piston machines but without the poor specific powers (power densities) associated with linear alternators.

Therefore, it is a principal object and purpose of the invention to provide an alpha configured Stirling machine that is drivingly coupled to a rotary electromagnetic transducer in a manner that eliminates the practical barrier to combining them, which is their high friction and resulting need for lubricants, in order to provide a resulting coupled Stirling machine and electromagnetic transducer that has no requirement for oil lubrication, friction-free operation, little mechanism wear, and high power density.

BRIEF SUMMARY OF THE INVENTION

The invention is a drivingly coupled free-piston Stirling machine and at least one rotary electromagnetic transducer. At least one pulley, and preferably two pulleys, are oriented in a plane of the connecting rod and have an axis of rotation perpendicular to the plane. The pulley having an arcuate peripheral surface that extends adjacent to the connecting rod. At least one motion translating drive link drivingly connects the connecting rod to the pulley by at least two straps so that the pulley moves in rotationally oscillating motion. One strap is fixed to a side of the pulley that is distal from the piston and extends in a first direction along a peripheral arcuate surface of the pulley into fixed connection with the connecting rod at a location along the piston rod that is nearer the piston than the pulley axis of rotation. Another strap is fixed to a side of the pulley that is proximal to the piston and extends opposite the first direction along a peripheral arcuate surface of the pulley into fixed connection with the connecting rod at a location along the piston rod that is farther from the piston than the pulley axis of rotation. A mechanical drive link between each pulley and a rotary electromagnetic transducer causes both the rotary electromagnetic transducer and the pulley to move in rotationally oscillating motion. Preferably a piston spring is linked to a piston for resonating the piston in reciprocation at an operating frequency of the Stirling machine and a torsion spring is linked to the pulley for resonating the pulley in rotational oscillation at the operating frequency of the Stirling machine.

BRIEF DESCRIPTION OF THE SEVERAL VIEWS OF THE DRAWINGS

FIG. 1 is a view in axial section of a prior art beta configured, free-piston, Stirling machine.

FIG. 2 is a view in perspective of the principal components of a prior art, four piston, alpha configured, free-piston Stirling machine.

FIG. 8 is a diagram illustrating the thermodynamic connection and piston positioning of the embodiment of the invention illustrated in FIG. 3.

FIG. 9 is a phasor diagram illustrating the relative phase of the reciprocating pistons in an embodiment of the invention.

FIG. 10 is a view in perspective like the view of FIG. 4 but with electromagnetic transducers drivingly connected to the Stirling machine.

FIG. 11 is a view in perspective, from the angle of FIG. 4, and illustrating a motion translating drive link drivingly connecting a connecting rod to a pulley by at least two straps.

FIG. 12 is a diagram in side elevation showing an electromagnetic transducer connected between two pulleys.

Figure 3:
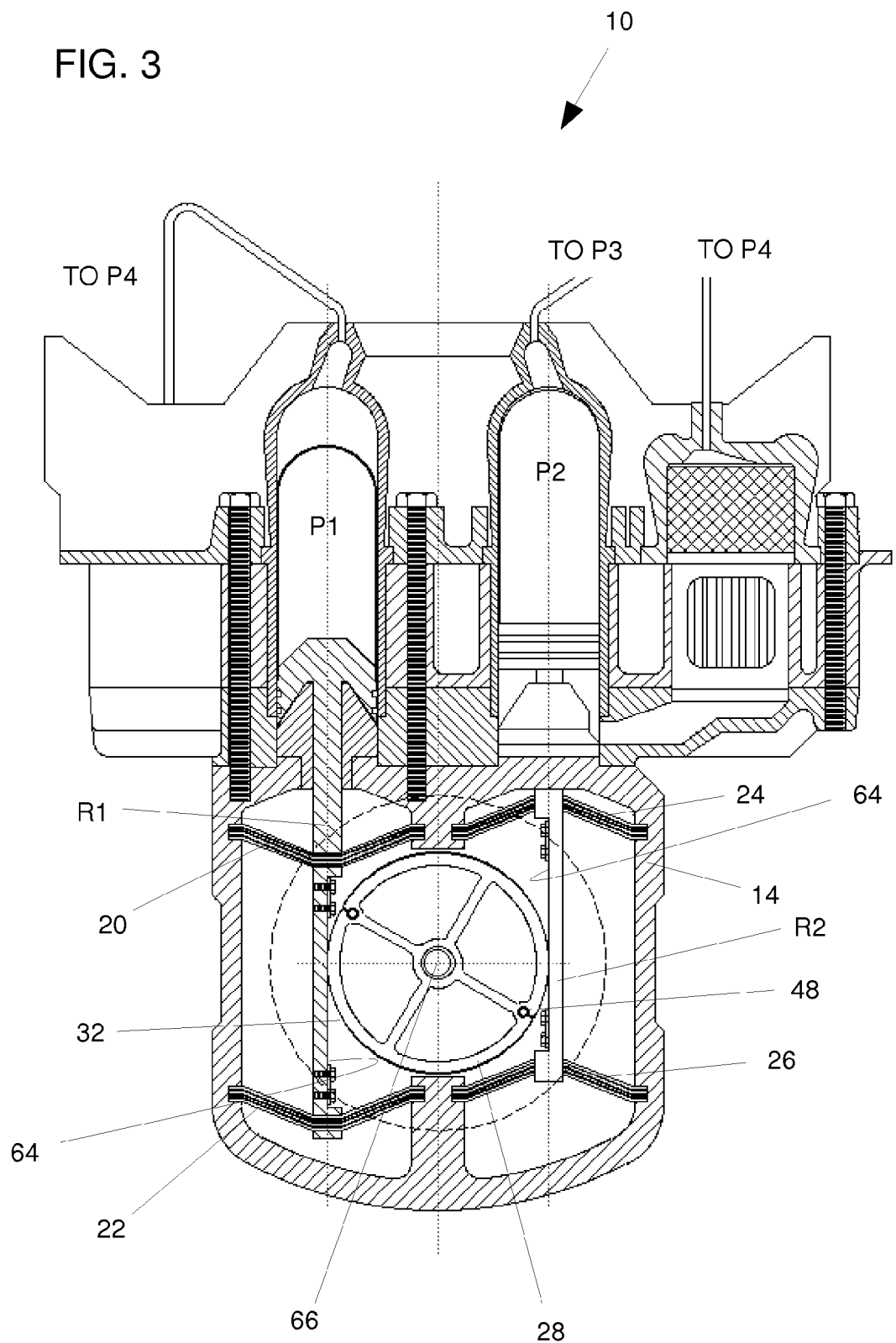
FIG. 3 is a view in vertical section of a four piston, alpha configured, free-piston Stirling machine embodying the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other structures where such connection is recognized as being equivalent by those skilled in the art. Those skilled in the art will recognize that there are many, and in the future may be additional, alternative structures which are recognized as equivalent by the prior art because they provide the same function.

DETAILED DESCRIPTION OF THE INVENTION

Incorporated in this application by reference are: the present inventor's provisional application 61/255525 filed Oct. 28, 2009; U.S. Pat. Nos. 5,753,985; 7,134,279; and 7,171,811 on which the present inventor is a co-inventor.

Definitions

In describing the present invention, various terms are used. Although the definitions and scope of these terms are known by those skilled in the art, it may be helpful to provide some explanation of them.

"Stirling machines, Stirling engines, Stirling coolers-heat pumps". As well known in the art, in a Stirling machine a working gas is confined in a working space that includes an expansion space and a compression space. The working gas is alternately expanded and compressed in order to either do work or to pump heat. The working gas is cyclically shuttled between the compression space and the expansion space which are connected in fluid communication through a heat accepter, a regenerator and a heat rejecter. The shuttling cyclically changes the relative proportion of working gas in each space. Gas that is in the expansion space, and gas that is flowing into the expansion space through a heat exchanger (the accepter) between the regenerator and the expansion space, accepts heat from surrounding surfaces. Gas that is in the compression space, and gas that is flowing into the compression space through a heat exchanger (the rejecter) between the regenerator and the compression space, rejects heat to surrounding surfaces. The gas pressure is essentially the same in the entire work space at any instant of time because the expansion and compression spaces are interconnected through a path having a relatively low flow resistance. However, the pressure of the working gas in the work space as a whole varies cyclically and periodically. When most of the working gas is in the compression space, heat is rejected from the gas. When most of the working gas is in the expansion space, the gas accepts heat. This is true whether the machine is working as a heat pump or as an engine. The only requirement to differentiate between work produced or heat pumped, is the temperature at which the expansion process is carried out. If this expansion process temperature is higher than the temperature of the compression space, then the machine is inclined to produce work so it can function as an engine and if this expansion process temperature is lower than the compression space temperature, then the machine will pump heat from a cold source to a warm heat sink.

As also well known in the art, there are three principal configurations of Stirling machines. The alpha configuration has at least two pistons in separate cylinders and the expansion space bounded by each piston is connected to a compression space bounded by another piston in another cylinder. These connections are arranged in a series loop connecting the expansion and compression spaces of multiple cylinders. The beta configuration has a single power piston arranged within the same cylinder as a displacer piston. A gamma Stirling is similar to a beta Stirling but has the power piston mounted in a separate cylinder alongside the displacer piston cylinder.

Stirling machines can operate in either of two modes to provide either: (1) an engine having its piston or pistons driven by applying an external source of heat energy to the expansion space and transferring heat away from the compression space and therefore capable of being a prime mover for a mechanical load, or (2) a heat pump having the power piston or pistons (and sometimes a displacer piston) cyclically driven by a prime mover for pumping heat from the expansion space to the compression space and therefore capable of pumping heat energy from a cooler mass to a warmer mass. The heat pump mode permits Stirling machines to be used for cooling an object in thermal connection to its expansion space, including to cryogenic temperatures, or for heating an object, such as a home heating heat exchanger, in thermal connection to its compression space. Therefore, the term Stirling "machine" is used generically to include both Stirling engines and Stirling heat pumps, the latter sometimes being referred to as coolers. Both Stirling engines and Stirling heat pumps, are both basically the same power transducer structures capable of transducing power in either direction between two types of power, mechanical and thermal.

"Electromagnetic transducers". As known in the art, both an electric motor and an alternator are similarly the same basic device. They are electromagnetic transducers that have a stator, ordinarily having an armature winding, and a rotating or reciprocating member that includes magnets, usually permanent magnets. They convert power in either direction between electrical power and mechanical power. A motor/alternator structure can be mechanically driven by a prime mover to generate electrical power output or a motor/alternator can be driven by a source of alternating electrical power to operate as a motor providing a mechanical output.

Consequently, both a Stirling machine and a motor/alternator structure are energy transducers that can each be operated in either of two modes. They can be drivingly connected together with one operating as the prime mover and the other performing work, either generating electrical power or transferring heat. In this invention, the electromagnetic transducer is a rotary alternator/motor that is either driven in rotationally oscillating motion by the Stirling machine operating as a Stirling engine to generate electrical power, or the alternator/motor is operated as an electrical motor that is driven in rotationally oscillating motion by electrical power and drives the Stirling machine to transfer heat and thereby provide a heat pump or cooler.

The alternator/motor used with the present invention can be a conventional rotary motor or alternator of the type that is widely commercially available even though in this invention it is operated in rotationally oscillating motion. Of course it can have a modified construction that is specially adapted to the invention.

"Piston rod". As used in this description, a "connecting rod" is an essentially rigid link connecting a piston to another component. Commonly, a connecting "rod" is a solid cylindrical rod but it is not necessary that the connecting rod be a solid material throughout its cross section and it is not necessary that it have a cylindrical peripheral surface or even a symmetrical outer peripheral surface when viewed in cross section. For example a connecting rod can be a tube and or have an I-beam or L-beam cross-section. Therefore the term "rod" is used but is not limited to a solid rod but includes other shapes of rigid connecting arms, including multiple smaller arms that together act mechanically as a single connecting arm.

"Resonating" means that a spring is linked or connected to a body and the spring and the mass of the body have characteristics that form a resonant system that has a resonant frequency. The spring constant, force constant or torsion coefficient of the spring is related to the total mass of a body so that they have a natural frequency of oscillation, either angular oscillation (for rotationally oscillating body) or linear (reciprocating) oscillation. The resonant frequency of the bodies in the invention is the operating frequency of the Stirling machine. When describing the oscillating motion of one or more bodies in a resonant system, the principal structure, such as the piston or a pulley, is sometimes referred to as being resonated. It should be understood, however, that the effective mass of a body in a resonant system includes the mass of all structures that are attached to and move with it. With respect to resonating the piston, the piston mass includes the mass of the piston rod and other masses that are attached to the piston or piston rod. With respect to resonating the pulley, the mass includes the masses rigidly connected to the pulley including rigidly attached components of the rotary electromagnetic transducer.

"Springs" are used in the present invention to resonate the oscillating and reciprocating masses. The term "spring" includes mechanical springs (such as coil springs, leaf springs, planar springs, spiral or involute springs), gas springs, such as formed by a piston having a face moving in a confined volume, electromagnetic springs and other springs as known in the prior art or a combination selected from them. Gas springs also include the working gas in the work space in a Stirling machine and, in some implementations, can also include the back space because the gas applies a spring force to a moving wall of a confined space as the volume of the space changes. As known to those in the art, generally a spring is a structure or a combination of structures that applies a force to two bodies that is proportional to the displacement of one body with respect to the other. The proportionality constant that relates the spring force to the displacement is referred to as the spring constant, force constant or torsion coefficient.

For resonating the rotary electromagnetic transducer component of the invention that will be described, a torsion spring is preferred but a spiral or involute spring, like the hairspring of a timepiece, may also be used.

Preferred Embodiments

Figure 4:
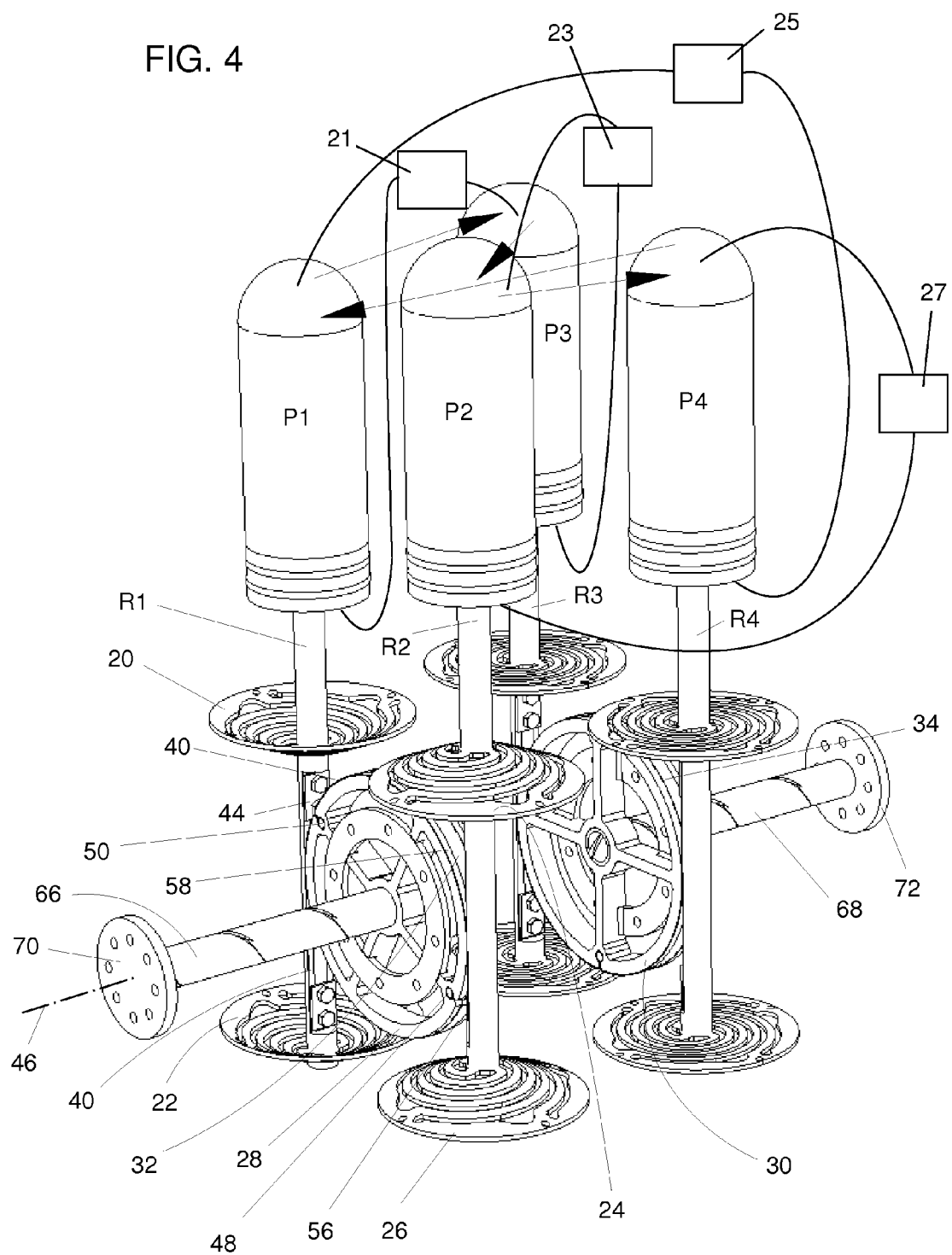
FIG. 4 is a view in perspective of the principal components of the embodiment of the invention illustrated in FIG. 3.
Figure 5:
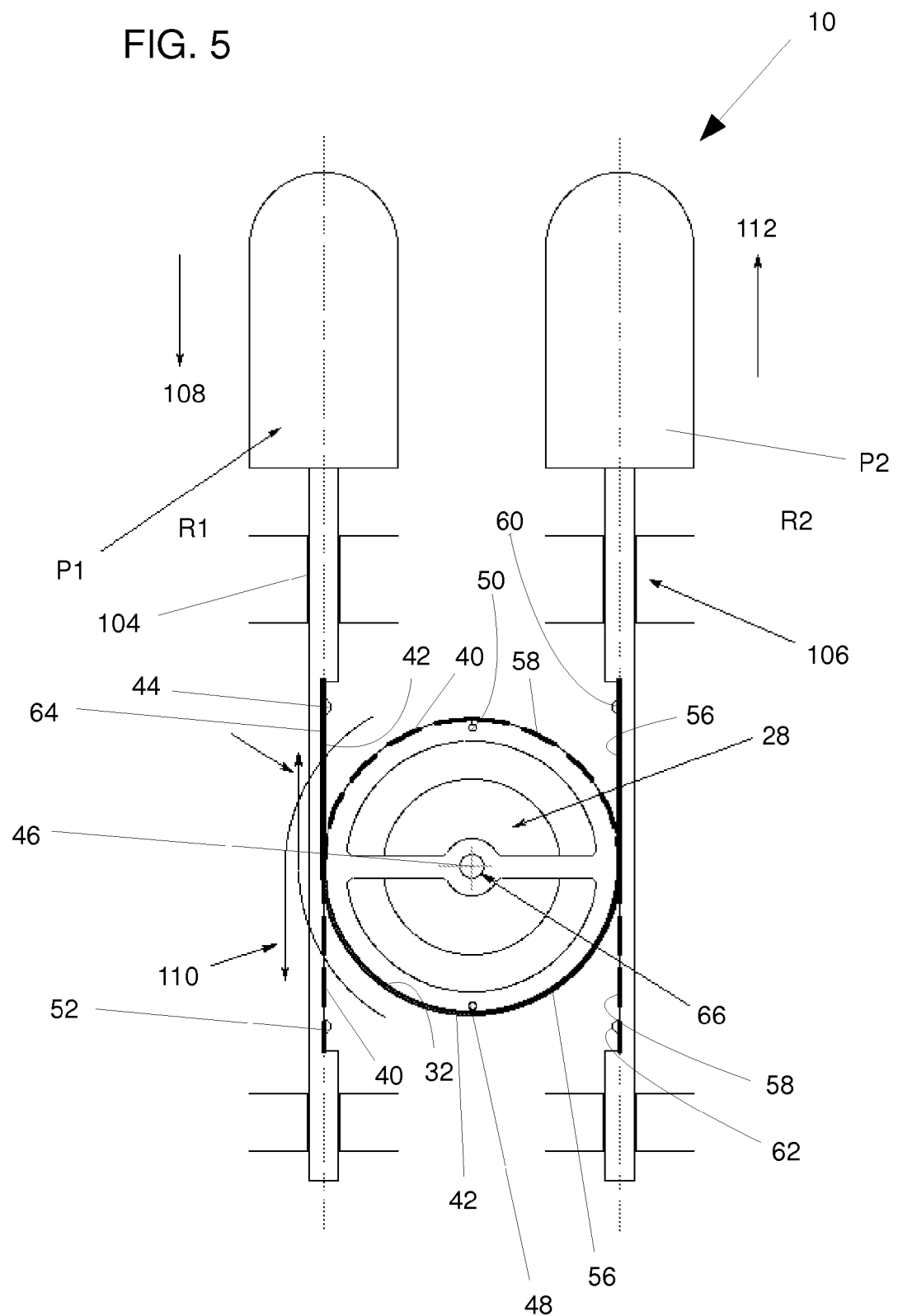
FIG. 5 is a diagrammatic view of the preferred embodiment of the invention illustrated in FIG. 2 illustrating principles of operation of the invention.

FIGS. 3, 4 and 5 show different views and illustrate aspects of the preferred embodiment of the invention. The preferred embodiment is a free-piston Stirling machine in an alpha configuration having four pistons, P1, P2, P3 and P4 arranged in parallel cylinders with their central axis at the corners of a rectangle. However, FIGS. 3 and 5 are end views and therefore only pistons P1 and P2 are visible. The relationships between pistons P1 and P2 and the structures that are visible in FIGS. 3 and 5 and are associated and cooperating with pistons P1 and P2 are essentially the same for pistons P3 and P4 except as otherwise noted or apparent to those skilled in the art. The preferred embodiment of FIGS. 3, 4 and 5 will first be described in somewhat general terms. Then the description will be elaborated upon for providing additional information.

FIGS. 3-5 shows a free-piston Stirling machine 10 that is drivingly coupled to at least one rotary electromagnetic transducer. However, the rotary electromagnetic transducers are omitted to reveal other components and are themselves illustrated in FIGS. 6, 10, and 12. These components are enclosed in a casing 14. The Stirling machine includes at least one piston reciprocating in its cylinder and has a connecting rod fixed to the piston. The free-piston Stirling machine 10 of FIGS. 3-5 is an alpha configured machine and has four pistons P1, P2, P3, and P4. There are four connecting rods R1, R2, R3, and R4 with each connecting rod connected to one of the pistons.

The cylinders and their pistons are thermodynamically interconnected for operating at phase angles of 0°, 90°, 180°, and 270°. These thermodynamic connections are the same as commonly used in prior art alpha configured free-piston Stirling machines. Although the thermodynamic connections in the invention are as in the prior art, the physical positioning of the cylinders and pistons is different from the common prior art placement and is important in the present invention. That is now explained further. As known in the prior art, in an alpha configured Stirling machine the compression space of each cylinder, at an end of each piston, is connected in serial connection through a heat rejector, a regenerator and a heat acceptor to the expansion space of another cylinder and its piston. This is illustrated in FIG. 1 of U.S. Pat. No. 7,171,811. All four cylinders and pistons are connected in this way in a daisy chain manner. The connection of these expansion and compression spaces in this manner is referred to as the thermodynamic connection of the Stirling machine. Still referring to FIG. 1 of U.S. Pat. No. 7,171,811, it can be seen that the axes of reciprocation of the pistons are parallel and the pistons are located at the apexes of a square. As one travels in a path around the square, the phase of each piston is 90° from the phase of the next piston along that path. Each pair of pistons along any side of the square operate with a 90° phase angle between them.

Although the same thermodynamic connection is used in the present invention, the physical positioning of the pistons and their cylinders is different and may be thought of as having been rearranged so that the pistons along one side of the square operate at a 180° phase difference from each other and the pistons along the opposite side of the square operate at a 180° phase difference from each other. That also means that the phase of the pistons along one of those sides of the square operate 90° (or 270°) out of phase with the pistons along the opposite side of the square. These phase relationships are illustrated by the phasor diagram of FIG. 9. An important characteristic of the invention is that there is one pair of pistons having their axes of reciprocation and their respective piston rods in one plane and reciprocating at 180° with respect to each other and a second pair of pistons having their axes of reciprocation and their respective piston rods in a plane and reciprocating at 180° with respect to each other. Although it is not necessary that the first pair of pistons and cylinders have a particular physical positioning relationship to each other, it is desirable that all pistons reciprocate along parallel axes arranged in a symmetrical manner in order to minimize vibration. The thermodynamic connection of the invention is illustrated diagrammatically in FIG. 4 by lines, representing flow paths, extending from an end of each piston through a box, representing a series heat rejector, regenerator and heat acceptor, with a line continuing on to the opposite end of another piston. Each series heat rejector, regenerator and heat acceptor, 21, 23, 25, and 27 is connected and functions in the manner that is well known in the prior art. This thermodynamic connection of the invention along with the physical positioning of the pistons and their cylinders is also illustrated diagrammatically in FIG. 8. The pair of pistons P1 and P2 may be referred to herein as the forward or fore pair because they are visible in FIGS. 3 and 5. They operate at a 180° phase relationship to each other. The pair of pistons P3 and P4 may be referred to herein as the aft pair. They operate at a 180° phase relationship to each other. The result of all this is that, in the preferred embodiment of the invention, the pistons are physically arranged to locate the piston rods of a first pair of pistons, that are operating at a 0° and 180°, in a first plane and to locate the piston rods of a second pair of pistons, that are operating at a 90° and 270°, in a second plane.

Piston Springs

Each piston is linked to a piston spring for resonating the piston and masses that are rigidly connected to the piston. at the designed operating frequency of the Stirling machine. Consequently, for each piston the designer selects the combination of a proportionality constant for the spring and a total reciprocating mass to provide a resonant system at the desired operating frequency of the machine. In the embodiment of FIGS. 3-5, each of the pistons P1, P2, P3, and P4 is resonated by a combination of springs all applying a spring force component on the piston. These springs are principally a pair of planar springs, and secondarily the working gas. For example, piston P1 is resonated principally by the two planar springs 20 and 22 connected between the piston rod R1 and the casing 14 or alternatively to a structure that is fixed relative to the casing. Piston P2 is resonated by the two planar springs 24 and 26 connected between the piston rod R2 and the casing 14. The planar springs also provide radial support of the piston rods. As seen in FIG. 4, the pistons P3 and P4 are resonated and supported in the same manner. As best seen in FIG. 4, there are two pulleys 28 and 30. The pair of planar springs for resonating each piston are preferably positioned on opposite sides of the pulley that is adjacent the piston rod to which the pair of planar springs are connected. For example, the planar spring 20 is located above the pulley 28 and the planar spring 22 is below the pulley 28.

Pulleys

The invention has at least one pulley oriented in the plane of at least one connecting rod. The pulley or pulleys have an axis of rotation that is perpendicular to that plane. As stated above, in the preferred embodiment of FIGS. 3-5 the pistons are physically arranged to locate the piston rods of a first pair of pistons, that are operating at phases of 0° and 180°, in a first plane and to locate the piston rods of a second pair of pistons, that are operating at phases of 90° and 270°, in a second plane. Consequently, the first pulley 28 is positioned in a first plane between the piston rods R1 and R2 of the first pair of pistons P1 and P2. Similarly, the second pulley 30 is positioned in a second plane between the piston rods R3 and R4 of the second pair of pistons P3 and P4. Each pulley 28 and 30 also has an arcuate peripheral surface 32, 34 that extends adjacent to at least one and preferably two connecting rods. "Adjacent the connecting rod" means that it is close, right next to it, so that the tension force exerted by the straps (described below) on the piston rod and the force exerted by the piston rod on the straps have a direction as parallel as possible to the central axis of the piston in order to avoid side loading on the piston rod (i.e. avoid forces having a component acting radially of the piston axis). It will be apparent after the description of those straps that there must be some space between the pulley and the outer surface of the connecting rod, but only enough to allow the strap in between. The outer peripheral surface of the pulleys can have grooves or channels in the arcuate peripheral surface of the pulley for receipt of the straps.

Strap Drive Links

In embodiments of the invention, each connecting rod is connected to a motion translating drive link that drivingly connects the connecting rod to a pulley. Each motion translating drive link comprises two straps, each connected at two points on the pulley and connected to its associated piston rod at two points on the piston rod. In the embodiment of FIGS. 3-5, the fore pair of piston rods R1 and R2 are each connected by such a drive link to the pulley 28. Similarly, the piston rods R3 and R4 are each connected by such a drive link to the pulley 30. Because there are four piston rods there are four motion translating drive links, each drive link connecting a connecting rod to the adjacent pulley in its plane. The purpose of the drive links is to translate between the reciprocating motion of the piston rods and rotationally oscillating motion of the pulleys. That allows the pistons' reciprocating motion to drive or be driven by the pulleys' rotationally oscillating motion.

FIGS. 4, 5 and 11 illustrate the straps of the motion translating drive links that drivingly connect each connecting rod to a pulley. In the diagram of FIG. 5, one pair of straps is diagrammatically illustrated by a solid black line and another pair of straps is illustrated by a dashed black line. Referring to the connection of the connecting rod R1 to the pulley 28, one strap 42 is fixed to a side of the pulley 28 that is distal from the piston P1. "Distal" means the side of the pulley that is farther or more distant from the piston which, in FIGS. 3-5 is the lower side of the pulley. The strap 42 is fixed to the pulley 28 at a point 48, such as by welding or more preferably by a keyhole shaped slot into which the strap 42 is inserted and then held in place by a dowel that conformingly fits into a circular hole portion of the slot and can not move radially outward through a narrower portion of the slot positioned radially outwardly of the circular hole. There are, of course, many other ways for fixing the strap to the pulley. This first strap 42 extends in a first direction (in this case clockwise) along a peripheral arcuate surface 32 of the pulley 28 into fixed connection with the connecting rod R1 at a location 44 along the piston rod P1 that is nearer the piston P1 than the pulley axis 46 of rotation.

Another strap 40 is fixed to a side of the pulley that is proximal to the piston in the same manner as the strap 42 is fixed to the pulley. "Proximal" means the side of the pulley that is closer to the piston which, in FIGS. 3-5 is the upper side of the pulley. The strap 40 is fixed to the pulley at point 50 and extends opposite the first direction (counterclockwise) along a peripheral arcuate surface of the pulley 28 into fixed connection with the connecting rod R1 at a location 52 along the piston rod R1 that is farther from the piston P1 than the pulley axis of rotation 46.

The piston rod R2 is also connected to the pulley 28 by another pair of straps. The strap 56 extends from fixed connection to the piston rod R2 at point 60 and along the peripheral arcuate surface 32 of the pulley 28 in a clockwise direction into connection to the pulley 28 at the point 48. Similarly, a second strap 58 extends from connection to the piston rod R2 at point 62 in a counterclockwise direction along the peripheral arcuate surface 32 of the pulley 28 into connection with the pulley at point 50. Piston rods R3 and R4 are connected to the aft pulley 30 by similarly constructed and arranged straps.

Although the straps connected to each piston rod are described functionally as two straps extending in opposite directions partially around a peripheral arcuate surface of a pulley, when there are two piston rods drivingly linked to the same pulley it is advantageous to form the two straps that connect the two distal ends of the piston rods to the pulley out of one integral piece of strap material that is fixed to the pulley at its center. Similarly, the two straps that connect the two proximal ends of the piston rods to the distal side of the pulley are preferably formed of one integral piece of strap material that is fixed to the pulley at its center. In other words the straps that are fixed to a side of the pulley that is distal from the pistons can be formed from a single length of strap material that extends a total of substantially 180° along a peripheral arcuate surface of the pulley to which they are connected. Similarly, the straps that are fixed to a side of the pulley that is proximal to the pistons are advantageously formed from a single length of strap material that extends a total of substantially 180° along a peripheral arcuate surface of the pulley to which they are connected. Consequently, although each strap functionally and conceptually extends 90° around the pulley, the single piece of strap material that forms two straps extends a total of 180°.

Alternatively, each strap could extend less than 90 degrees around the pulley but that would limit the angular range of oscillation to a smaller angular amplitude of oscillation. With each strap extending 90° for a total of 180° for the combined integral straps, the maximum range is angular oscillation is nearly 180°. However, it is contemplated that during normal operation of the embodiments of the invention, the angular amplitude of oscillation will vary and often be less than 180°, depending upon the power demand of the embodiment.

It should be apparent that, in operation, tension forces are applied to the straps. It is also apparent that the two straps that are connected to each piston rod apply their tension force to the pulley (when the pistons drive the pulley) in opposite rotational directions; that is they apply torques in opposite directions. The same two straps are also in a fixed connection to the same rigid piston rod. In order to prevent any backlash or slop in the strap connections between the piston rod and the pulley, it is desirable that each strap is mounted in an elastically pretensioned state. Since the preferred strap material is a metal, such as stainless steel, and metal has some elasticity, the straps are preferably prestressed in tension, so long as their elastic limit is not exceeded in operation.

It is also desirable that each piston rod be formed with a flat planar surface, such as surface 64, facing its adjacent pulley. Each flat planar surface is positioned and extends along the piston rod for seating against the straps that are connected to the piston rod on which the surface is formed.

The term "strap" is used in describing the tensioned component of the invention. However the strap can have a shape that is more commonly described as a cord, wire, tape, or belt. The strap of the invention has the characteristics that it resists tension so it can transmit a tension force from one location to another, it is sufficiently flexible so it does not fatigue and deteriorate, it has only a small elasticity so it does not stretch and permit backlash, and it is sufficiently thin that it can bend around the pulley without exceeding its elastic limit so it will not fatigue. The preferred shape is that its width is considerably greater than its thickness which contributes to these attributes. However, it could have other cross-sectional shapes, such as a circular wire. Although metal is the preferred material, various other materials, such as composites, known in the prior art can be used.

Each drive strap can be an integral one piece strap with the two straps attached to each piston rod arranged axially offset so they are side by side on the arcuate surface of a pulley. However, that construction would cause the straps to apply a torque to the pulley around a diametrical axis that extends between the points where the pulley is closest to the piston rods (horizontally in the Figs.) Therefore, preferably one drive strap is subdivided into parallel, spaced apart, component straps that operate together as a single strap. The other strap is a single strap that operates between the two strap components of the bifurcated strap.

Such a bifurcated strap is illustrated in FIG. 11. The bifurcated strap can extend along either the proximal or distal side of the pulley with the single strap extending along the other side. Additionally, the bifurcated and the single straps may be identically oriented or oppositely oriented on the two pulleys. FIG. 11 shows straps extending along the aft pulley 30 but shows them oriented oppositely than illustrated in FIG. 4. Referring to FIG. 11, strap 358 is bifurcated into two outer straps 358A and 358B both of which extend downwardly and along the arcuate peripheral surface of the pulley into fixed connection with the pulley at dowel 348. Preferably, the same strap material continues as two component straps along the peripheral arcuate surface of the pulley 30 into connection with the piston rod R3 by being clamped to the piston rod R3 by the clamping plate 370 secured to the piston rod R3 by machine screws 372 and 374. The other strap 356 is a single piece of strap material that passes between the bifurcated components 358A and 358B and extends along the proximal (upper) arcuate surface of the pulley 30 and is fixed to the pulley by the dowel 350. The strap material forming the strap 356 continues from the dowel 350 along the arcuate surface of the pulley and into fixed connection to the piston rod R3 and is fixed to the piston rod R3 by the clamping plate 376 secured to the piston rod R3 by machine screws 378 and 380. This bifurcated construction balances the forces applied to the pulley by the straps while allowing the straps to pass by each other without sliding against each other and interfering.

Torsion Springs

A different torsion spring is linked to each pulley and resonates the pulley and the masses rigidly connected to the pulley in rotational oscillation at the operating frequency of the Stirling machine. Each torsion spring extends from its associated pulley to a fixed connection to the casing. Referring to FIGS. 3 and 4, a torsion spring 66 extends from its fixed connection to the pulley 28 to a fixed connection to the casing 14. The preferred torsion spring is a rod or bar as illustrated. The torsion spring 66 is fixed to the casing by bolts through holes in a hub 70. Similarly, a torsion spring 68 extends from its fixed connection to the pulley 30 to a fixed connection to the casing 14 by means of a hub 72. Alternatively, the torsions springs illustrated in the drawings could be replaced by rigid axles that permit rotary motion of the pulleys on a bearing and another type of spring, such as a spiral or involute spring, used for resonating the pulley. However, that is not preferred in part because it is more complicated and a pulley journaled to a bearing would present a friction and lubrication problem.

Rotary Transducers

There is a mechanical drive link between each pulley and a rotary electromagnetic transducer so that each rotary electromagnetic transducer is driven in rotationally oscillating motion by a pulley. Where there are two pulleys, each is connected to a different rotary electromagnetic transducer so that one rotary electromagnetic transducer is drivingly connected to one of said pulleys and the second rotary electromagnetic transducer is drivingly connected to the other of the pulleys. As known in the art, a rotary electromagnetic transducer ordinarily has a rotor and a stator. Either one may be drivingly linked to a pulley and the other, for each transducer, is connected to the casing to permit the pulley to move one with respect to the other in rotationally oscillating motion with the other held stationery.

FIG. 10 is like FIG. 4 but additionally illustrates two rotary electromagnetic transducers 402 and 404. Their rotors are connected to the pulleys such as by fixing a hub on the rotor shaft (like the hub 70 in FIG. 4) and bolting the hub to the pulley so that the bolts and the hubs are the mechanical link between the transducers and the pulley. This arrangement for connecting the rotor to the pulley may be the same as shown in the arrangement illustrated in FIG. 12 and described below. The stator is then fixed to the casing, such as by arms 406 and 408 that are fixed to the stator and extend outwardly into a fixed connection to the casing.

A third rotary electromagnetic transducer may be drivingly linked between the two pulleys as illustrated in FIG. 12. In that case, the rotor is linked to one pulley and the "stator" is linked to the other so that both the rotor and the stator are driven by a different pulley, or drive the pulleys, in rotationally oscillating motion. Referring to FIG. 12, the stator 420 of a rotary electromagnetic transducer is fixed to the pulley 28. The rotor shaft 422 is fixed to a hub 424 that is fixed to the pulley 30. Use of a third electromagnetic transducer improves the power density of the coupled free-piston Stirling machine and rotary electromagnetic transducer because it improves the summed power density of the total number of electromagnetic transducers. Power density is improved because it distributes the power generation or motor power consumed among more rotary electromagnetic transducers so each generates or uses a smaller proportion of the total power. As a result, each electromagnetic transducer can be made smaller and therefore with a higher power density. If each pulley oscillates at 180°, then the electromagnetic transducer connected between them oscillates at $\sqrt{2} \times 180° = 254.558°$ and their motions are 90° out of phase.

Although the preferred rotary electromagnetic transducer is a non-commutating electrical alternator or motor, a commutated DC motor could be used. For example, a two pole DC motor can be used with the brushes positioned so that they never rotate to a point where they switch (commutate) during the rotational oscillation. Embodiments of the invention require an electromagnetic transducer with a permanent magnet or electro-magnet to provide a magnetic field and an armature winding with relative rotationally oscillatory motion between its magnetic field and the armature winding.

Elaboration On Alpha Configuration

FIGS. 3-5 are now reviewed for the purpose of providing additional perspective and information. FIG. 3 shows the current invention as it may look when installed in a larger alpha-type Stirling engine. The view is end-on so only one pair of pistons is visible and that pair is at the extreme of its counterclockwise rotation or maximum differential stroke. The piston assemblies are located in their linear motions by planar springs while the oscillating pulley is located rotationally by a torsion spring and the tension straps connected to the piston rods and the pulley. The pair of pistons shown are connected to each other and to the oscillatory pulley so that they operate 180° out-of-phase. The second pair of pistons are identically configured and therefore also operate 180° out of phase with each other. Each of the two piston assembly pairs operate 90° out-of-phase with each other so that the 90° thermodynamic phasing that is proper for a four piston alpha configured Stirling machine can be accommodated. The two pistons in this view are not connected to each other through the thermodynamic cycle connections.

This means that there are two two-piston combinations operating 180° out-of-phase with each other. The two-piston combinations operate 90° out-of-phase with each other. In FIG. 3, pistons P1 and P2 are one of the 180° out-of-phase pairs and are shown at the extremes of their strokes. The second pair is not visible in this view. The thermodynamic cycle is connected between spaces that are 90° out-of-phase in the manner illustrated in FIG. 4 and described above. Planar springs 20 and 22 support and guide the connecting rod R1 and planar springs 24 and 26 support and guide the connecting rod R2. The planar springs serve a second purpose and that is to provide any additional springing needed, above that provided by the gas pressures, so that the linearly moving assembly of the piston and connecting rod are resonated at the operating frequency. The spring forces therefore balance the inertia forces. Pulley 28 is mounted on a torsional spring 66 so that rotating inertia is balanced by the torsional spring at the operating frequency. Tension straps on the periphery of the pulley are connected to the pistons in a manner shown more clearly in FIG. 4.

FIG. 4 shows, in a perspective view, the oscillatory mechanism set up on two pairs of pistons, each pair operating 90° from each other. The pistons are resonated and guided by planar spring assemblies as described above while the pulleys are located and resonated by torsional springs. Tension straps connect each piston pair with their associated pulley. The two pulleys are in turn connected to a rotationally oscillating alternator or motor. A third alternator or motor may be located between the pulleys, if needed.

Referring to FIG. 4, Tension straps are connected to the pulley 28 by dowel pins 48 and 50. The dowel pins lock the tension straps to the pulley so that no relative contact motion occurs between the pulley and the tension straps. Clamps on the connecting rods similarly ensure that there is no relative contact motion between the straps and the connecting rods. The fore oscillating assembly with pistons P1 and P2 is shown in its maximum counterclockwise position so that planar springs 24 and 26 are shown deflected maximally towards the 'in' direction while planar springs 20 and 22 are maximally deflected towards the 'out' direction. Since the aft oscillating assembly with pistons P3 and P4 is 90° out-of-phase with the fore oscillating assembly, all planar springs in the aft assembly are undeflected and the assembly is in its mean position when the fore assembly is at either the "in" or the "out" maximum position. While the planar springs together with the gas pressure forces resonate the piston assemblies, the torsion springs resonate the rotational inertia of the rotating components including the pulleys. By resonating the linear components separately from the rotating components, only the work forces are transmitted by the tension straps. The work forces are much smaller than the inertial and spring forces. The fore and aft torsion springs are mounted to the casing by flanges or hubs 70 and 72. The work coupling, either supplied or extracted, is taken from pulleys 28 and 30, which are attached to a rotationally oscillating electromechanical transducers commonly called a non-commutating electrical motor or alternator. The thermodynamic cycles are formed between 90° out-of-phase pistons as shown by the straight arrows above the pistons.

FIG. 5 is a sketch of a piston pair showing the location of the tension straps and how they impart rotationally oscillatory motion to a pulley. In this case gas bearings are shown for guidance of the piston rods. The pistons P1 and P2 (like the pistons P3 and P4) are guided by bearings 104 and 106. These bearings are preferably gas bearings in order to keep the assembly wear free. The details of the gas bearings are not shown because they are well know in the art. For a prime mover, that is, when work is delivered from the pistons, the piston is forced in the 'out' direction 108 by the cycle gas pressure. This places tension strap 40 in tension, designated by the dashed lines, and pulls it in direction 110 thus rotating the pulley assembly 28 on its torsion spring 66 in a counterclockwise direction. The tension strap 58 also pulls on the second piston P2 so that it moves in the 'in' direction 112. When the pistons move in the opposite directions, tension straps 40 and 58 remain the tension members since as a prime mover, the output force is provided by the pistons and the 'in' motion is resisted because it is associated with gas transfer and compression. Tension straps 42 and 56 do not deliver significant force to the pistons in the prime mover configuration but rather serves to hold and locate the pulley assembly 28 at its relative position with respect to the piston connecting rods. However, in the heat pump configuration, work is delivered to the system and tension straps 40, 42, 56 and 58 alternatively come into tension depending on the direction of the motion. During operation, the tension forces in the tension straps will change cyclically for either the prime mover or the heat pump and these forces are not symmetrical.

In the manner described above, the linearly oscillating components are resonated separately from the rotationally oscillating components. This is to minimize the force on the tension straps. If both the pistons and the pulleys are resonated, the forces on the straps are relatively small. The springs alternately store and give up energy, so they alternately absorb and do work. The springs apply forces to the reciprocating and the rotationally oscillating masses. When pistons and the pulleys are resonated, the only force applied by the straps is the additional work input during each cycle. Most of the force to accelerate the rotationally oscillating and reciprocating masses comes from the springs and most of the energy absorbed and the force to decelerate the rotationally oscillating and reciprocating masses is applied to the springs. Of course, practical considerations may lead to resonating the linear and rotational oscillating components in a different mix. However, the full resonating spring force for both linear and rotating components may come from the working gas alone in which case there would be no need for a torsion spring or a piston spring. On the other hand, added springing is desirable as illustrated in the preferred embodiments. In all cases where the linear and rotational components are not resonated separately, higher forces will result in the tension straps. In the case of heat pumps where the machine is driven, it is always possible to drive off resonance resulting in higher forces in the tension straps. Normal engineering design practice is required to ensure that the tension straps and their mountings are not overstressed.

Figure 6:
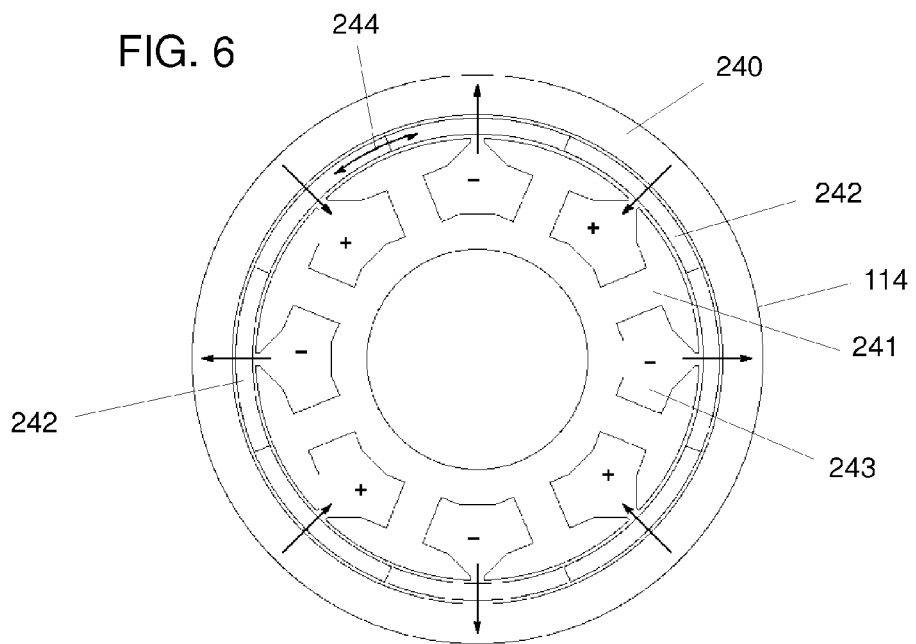
FIG. 6 is a view in section taken substantially in a plane perpendicular to the axis of rotation of a rotary alternator or motor with eight poles that may be used in embodiments of the invention and operated in rotationally oscillating motion.

In embodiments of the invention, the rotationally oscillating output is connected to an alternator or motor similar to that shown in FIG. 6 as an example of a non-commutated alternator or motor. FIG. 6 shows a rotating oscillatory alternator or motor with eight poles. The iron may be flat-packed lamination material. The radial distance to the magnets may be adjusted for optimum use of material and packing. The '+' and '−' signs indicate the direction of the windings and the arrows indicate the direction of magnetization on the magnets. The magnet ring oscillates rotationally back and forth with the motion of the pulleys. There are many different configurations of electromechanical transducers that will function for this role. This is only one example.

The iron consists of an outer ring 240 and an inner iron 241. Permanent magnets 242, magnetized radially according to the arrows, are physically connected to the rotationally oscillating output from the drive mechanism. The magnets are therefore driven in a rotationally oscillating manner as shown by arrow 244 and subjecting the iron to alternating magnetic fields that induce currents in windings going from '+' to '−' in windows 243. In a motor, an alternating current is provided to the windings and this sets up an alternating winding field in the iron that force the magnets to move in a rotationally oscillating manner. Rotationally oscillating alternators or motors have two major advantages over linear alternators or motors. Firstly, the rotationally oscillating design allows the iron to be assembled out of flat packed lamination stock thus greatly increasing the packing density over a linear motor's radially packed laminations. Secondly, the magnet velocity may be arbitrarily increased (within practical limits) by setting the magnets on a larger radius than the output pulley. This increases the power density over the linear motor in which the piston velocity and the magnet velocity have to be identical. Redlich in U.S. Pat. No. 5,753,985 discloses an alternative rotationally oscillating alternator or motor.

Beta Configuration

Figure 7:
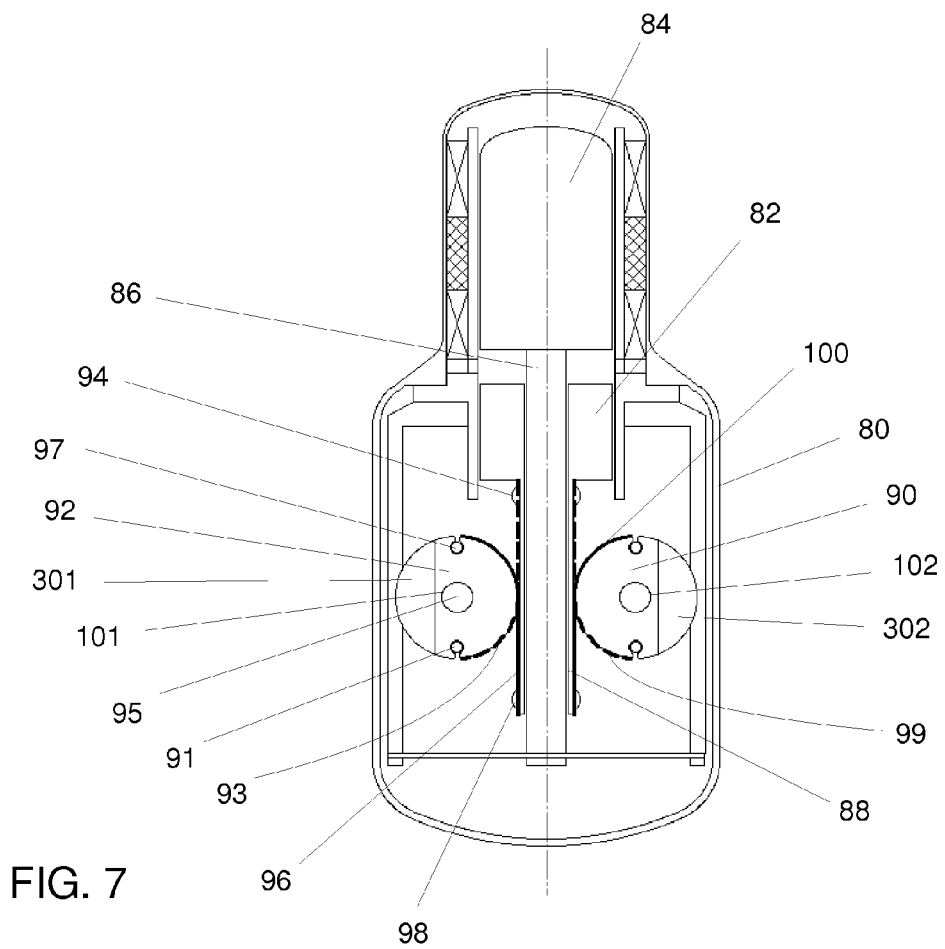
FIG. 7 is a view in axial section of a beta configured, free-piston, Stirling machine embodying the invention.

FIG. 7 illustrates an embodiment of the invention applied to a free-piston Stirling machine in a beta configuration. Like the prior art illustrated in FIG. 1, the beta configured Stirling machine has a casing 80, a piston 82, and a displacer 84 with a displacer rod 86 extending through a central bore in the piston 82. The piston 82 has a piston rod 88 fixed at its upper end to the piston 82. The piston rod may be a tube through which the displacer rod may reciprocate, a pair of downwardly extending arms fixed at their upper ends to the piston 82 or be of another form.

Although a single pulley can be used, it would cause unbalanced forces and vibration. Therefore, the preferred beta implementation of the invention has two pulleys 90, 92 oriented in a plane that includes the axis of the piston connecting rod 88. The pulleys 90 and 92 have an axis of rotation perpendicular to that plane. Both pulleys have an arcuate peripheral surface that extends adjacent to the connecting rod 88. Two motion translating drive links drivingly connect the piston connecting rod 88, one to each of the two pulleys. Each of the two motion translating drive links have at least two straps and are constructed like the drive links described above for the alpha configured Stirling machine.

A strap 93 is fixed by keyhole slot and dowel 91 to a side of the pulley 92 that is distal from the piston 82 and extends in a first direction (counter clockwise) along a peripheral arcuate surface of the pulley 92 into fixed connection with the connecting rod 88 at a location 94 along the piston rod 88 that is nearer the piston 82 than the pulley axis 95 of rotation. A second strap 96 is fixed by keyhole slot and dowel 97 to a side of the pulley 92 that is proximate to the piston 82 and extends in the opposite direction (clockwise) along a peripheral arcuate surface of the pulley 92 into fixed connection with the connecting rod 88 at a location 98 along the piston rod 88 that is farther from the piston 82 than the pulley axis 95 of rotation. Straps 99 and 100 are connected between the connecting rod 88 and the pulley 90 in the same manner. Although the illustrated straps each extend about 90° along the arcuate surface of their associated pulley, in this embodiment they both could extend 180° to allow a 360° maximum range of rotational oscillation. Torsion springs 101 and 102 are linked to each pulley and to the casing 80 in the same manner as illustrated in FIGS. 3-5 and resonate their associated pulley and masses rigidly connected to the pulley in rotational oscillation at the operating frequency of the Stirling machine.

Each of the pulleys 90 and 92 also have a mechanical drive link between each pulley and a rotary electromagnetic transducer and driving the rotary electromagnetic transducer in rotationally oscillating motion. Although the electromagnetic transducers are not illustrated in FIG. 7, they can be connected like those described for the alpha configured embodiment or in any other manner that would be obvious from this description to a person of ordinary skill in the art.

The pulleys may further employ balance masses so that no residual forces are transmitted to the casing of the machine. There may be advantages in applying the rotationally oscillating mechanism to beta configuration free-piston Stirling prime movers and heat pumps. Referring to FIG. 7, displacer 84 and piston 82 are the reciprocating elements of a beta Stirling machine. Piston 82 has an extension forming a piston rod 88 below the piston to accommodate and anchor the tension straps. (differentiated by solid and dashed lines) The tension straps also connect to the two pulleys. Torsion springs 101 and 102 may assist in the rotational resonance. A unique aspect of the invention as shown here is the application of balance masses 302 and 304 each fixed on a different one of the pulleys. The balance masses 302 and 304 move in the opposite direction to the piston and may be used to balance the vertical reaction force from the piston. Due to symmetry, the balance masses 302 and 304 create no side-to-side forces. Alternators or motors of a manner described before may be used to extract or provide power to the machine depending on whether it is a prime mover or a heat pump. Although the balance masses 302 and 304 are preferably fixed on the pulleys 90 and 92, they can be fixed on the rotationally oscillating alternator or motor or any other mass that is fixed to, and rotationally oscillates with, the pulleys.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A drivingly coupled free-piston Stirling machine and at least one rotary electromagnetic transducer and having a casing, the Stirling machine including at least one piston reciprocating in its cylinder and having a connecting rod fixed to the piston, the coupled free-piston Stirling machine and rotary electromagnetic transducer more particularly comprising:
- (a) at least one pulley oriented in a plane of the connecting rod and having an axis of rotation perpendicular to the plane, the pulley having an arcuate peripheral surface that extends adjacent to the connecting rod;
- (b) at least one motion translating drive link drivingly connecting the connecting rod to the pulley by at least two straps and driving or being driven by the pulley in rotationally oscillating motion of the pulley,
  - (i) one strap being fixed to a side of the pulley that is distal from the piston and extending in a first direction (clockwise or counter clockwise) along a peripheral arcuate surface of the pulley into fixed connection with the connecting rod at a location along the piston rod that is nearer the piston than the pulley axis of rotation,
  - (ii) another strap being fixed to a side of the pulley that is proximal to the piston and extending opposite the first direction along a peripheral arcuate surface of the pulley into fixed connection with the connecting rod at a location along the piston rod that is farther from the piston than the pulley axis of rotation; and
- (c) a mechanical drive link between each pulley and a rotary electromagnetic transducer and moving the rotary electromagnetic transducer and the pulley in rotationally oscillating motion.

2. A coupled free-piston Stirling machine and rotary electromagnetic transducer in accordance with claim 1 and further comprising:
- (a) a piston spring linked to a piston, the piston spring resonating the piston and masses rigidly connected to the piston at an operating frequency of the Stirling machine; and
- (b) a torsion spring linked to each pulley and resonating the pulley and masses rigidly connected to the pulley in rotational oscillation at the operating frequency of the Stirling machine.

3. A coupled free-piston Stirling machine and rotary electromagnetic transducer in accordance with claim 2, wherein
- (a) the free-piston Stirling machine is an alpha configuration machine including four said pistons and connecting rods that are thermodynamically interconnected for operating at phase angles of 0°, 90°, 180°, and 270°, the pistons being physically arranged to locate the piston rods of a first pair of pistons, that are operating at a 0° and 180°, in a first plane and to locate the piston rods of a second pair of pistons, that are operating at a 90° and 270°, in a second plane;
- (b) a first said pulley positioned in the first plane between the piston rods of the first pair of pistons;
- (c) a second said pulley positioned in the second plane between the piston rods of the second pair of pistons;
- (d) at least four motion translating drive links, each drive link as previously recited and drivingly connecting a connecting rod to the adjacent pulley in its plane.

4. A coupled free-piston Stirling machine and rotary electromagnetic transducer in accordance with claim 3, wherein each strap is mounted in an elastically pretensioned state.

5. A coupled free-piston Stirling machine and rotary electromagnetic transducer in accordance with claim 4, wherein each pulley is fixed to a different torsion spring and each torsion spring extends from its associated pulley to a fixed connection to the casing.

6. A coupled free-piston Stirling machine and rotary electromagnetic transducer in accordance with claim 5 wherein each torsion spring is a rod or bar.

7. A coupled free-piston Stirling machine and rotary electromagnetic transducer in accordance with claim 4 wherein the straps that are fixed to a side of the pulley that is distal from the pistons are formed from a single length of strap material that extends a total of substantially 180° along a peripheral arcuate surface of the pulley to which they are connected and the straps that are fixed to a side of the pulley that is proximal to the pistons are formed from a single length of strap material that extends a total of substantially 180° along a peripheral arcuate surface of the pulley to which they are connected.

8. A coupled free-piston Stirling machine and rotary electromagnetic transducer in accordance with claim 7 wherein there is a second rotary electromagnetic transducer, one rotary electromagnetic transducer drivingly connected to one of said pulleys and the second rotary electromagnetic transducer drivingly connected to the other of said pulleys.

9. A coupled free-piston Stirling machine and rotary electromagnetic transducer in accordance with claim 8 wherein there is a third rotary electromagnetic transducer drivingly connected between the two pulleys.

10. A coupled free-piston Stirling machine and rotary electromagnetic transducer in accordance with claim 8 wherein the resonating piston spring linked to each piston comprises a pair of planar springs each extending between a fixed position relative to the casing to connection to its associated piston rod, the pair of planar springs for each piston being positioned on opposite sides of the pulley that is adjacent the piston rod to which the pair of planar springs is connected.

11. A coupled free-piston Stirling machine and rotary electromagnetic transducer in accordance with claim 10 wherein each piston rod has a flat planar surface facing its adjacent pulley, each flat planar surface positioned and extending along the piston rod for seating against the straps that are connected to the piston rod on which the surface is formed.

12. A coupled free-piston Stirling machine and rotary electromagnetic transducer in accordance with claim 11 wherein each torsion spring is a rod or bar.

13. A coupled free-piston Stirling machine and rotary electromagnetic transducer in accordance with claim 12 wherein there is a third rotary electromagnetic transducer drivingly connected between the two pulleys.

14. A coupled free-piston Stirling machine and rotary electromagnetic transducer in accordance with claim 1, wherein the free-piston Stirling machine is a beta configuration Stirling machine.

15. A coupled free-piston Stirling machine and rotary electromagnetic transducer in accordance with claim 14 and further comprising:
- (a) a piston spring linked to a piston, the piston spring resonating the piston and masses rigidly connected to the piston at an operating frequency of the Stirling machine; and
- (b) a torsion spring linked to each pulley and resonating the pulley and masses rigidly connected to the pulley in rotational oscillation at the operating frequency of the Stirling machine.

16. A coupled free-piston Stirling machine and rotary electromagnetic transducer in accordance with claim 15 wherein:
- (a) a second said pulley is positioned on the opposite side of the piston rod from the first said pulley;
- (b) a second said motion translating drive link drivingly connects the connecting rod to the second pulley.

17. A coupled free-piston Stirling machine and rotary electromagnetic transducer in accordance with claim 16, wherein each strap is mounted in an elastically pretensioned state.

18. A coupled free-piston Stirling machine and rotary electromagnetic transducer in accordance with claim 16 wherein each torsion spring is a rod or bar.

\* \* \* \* \*